United States Patent
Li (10) Patent No.: US 9,433,323 B2
(45) Date of Patent: Sep. 6, 2016

(54) CUTTING IMPLEMENT FOR FOOD PROCESSOR

(71) Applicant: CAB Plastics Ltd., Hong Kong (CN)

(72) Inventor: Yongsen Li, Hong Kong (CN)

(*) Notice: Subject to any disclaimer, the term of this patent is extended or adjusted under 35 U.S.C. 154(b) by 348 days.

(21) Appl. No.: 14/185,197

(22) Filed: Feb. 20, 2014

(65) Prior Publication Data

US 2014/0231566 A1   Aug. 21, 2014

(30) Foreign Application Priority Data

Feb. 20, 2013  (CN) ............... 2013 2 0078295 U (51) Int. Cl.
  *A47J 43/07*  (2006.01)

(52) U.S. Cl.
  CPC .................... *A47J 43/0722* (2013.01)

(58) Field of Classification Search
  CPC ................ A47J 43/0722; A47J 43/07
  USPC ................ 241/282.1, 282.2, 277
  See application file for complete search history.

(56) References Cited

U.S. PATENT DOCUMENTS

| | | | |
|---|---|---|---|
| 2,529,120 A * | 11/1950 | Wallach | A47J 43/06 192/18 R |
| 5,823,672 A | 10/1998 | Barker | |
| 6,298,776 B1 | 10/2001 | Ekstroem | |
| 6,299,085 B1 | 10/2001 | Ekstroem | |
| 6,364,226 B1 * | 4/2002 | Kubicko | A47J 43/06 241/282.1 |
| 6,446,547 B2 | 9/2002 | Kubicko et al. | |
| 6,923,010 B2 | 8/2005 | Small et al. | |
| 7,278,598 B2 | 10/2007 | Katz et al. | |
| 8,342,436 B2 | 1/2013 | Sim et al. | |
| 2005/0193896 A1 | 9/2005 | McGill | |
| 2010/0170404 A1 | 7/2010 | Hensel et al. | |
| 2011/0226140 A1 | 9/2011 | Herren | |
| 2012/0091245 A1 | 4/2012 | Menashes | |

FOREIGN PATENT DOCUMENTS

| | | |
|---|---|---|
| AU | 2003248198A1 A1 | 4/2004 |
| CN | 202104210 | 1/2012 |
| CN | 203076044 | 7/2013 |
| JP | 2000202413 A | 7/2000 |
| KR | 20120020547 A | 3/2012 |
| WO | 9322042 A1 | 11/1993 |
| WO | 9615706 A1 | 5/1996 |
| WO | 2004091323 A1 | 10/2004 |

OTHER PUBLICATIONS

International Search Report and Written Opinion for PCT/IB2014/059132, dated Jun. 30, 2014, 15 pages.

* cited by examiner

*Primary Examiner* — Mark Rosenbaum
(74) *Attorney, Agent, or Firm* — Kagan Binder, PLLC (57) ABSTRACT

In a cutting implement for a food processor, a blade axle is rotatable on a rotation axis thereof in a direction of rotation of the blade axle. At least one blade assembly is mounted on the blade axle. The at least one blade assembly has at least one single-piece arcuate blade having an upper blade section coupled to the blade axle, a lower blade section separate from the upper blade section and coupled to the blade axle, and a middle blade section extending arcuately between and interconnecting the upper and lower blade sections. The single-piece arcuate blade has a leading edge in the direction of rotation of the blade axle, with the leading edge at least in part being configured to define a cutting edge of the single-piece arcuate blade.

16 Claims, 8 Drawing Sheets

Prior Art

Prior Art

CUTTING IMPLEMENT FOR FOOD PROCESSOR

BACKGROUND

The present disclosure relates to the field of food processing devices, and more particularly to a cutting implement such as a blade assembly for a food processor.

Food processors include pulverizers, blenders and meat grinders, and are used to cut or grind food into small particles. They generally have cutting implements with sharp edges.

Figure 1:
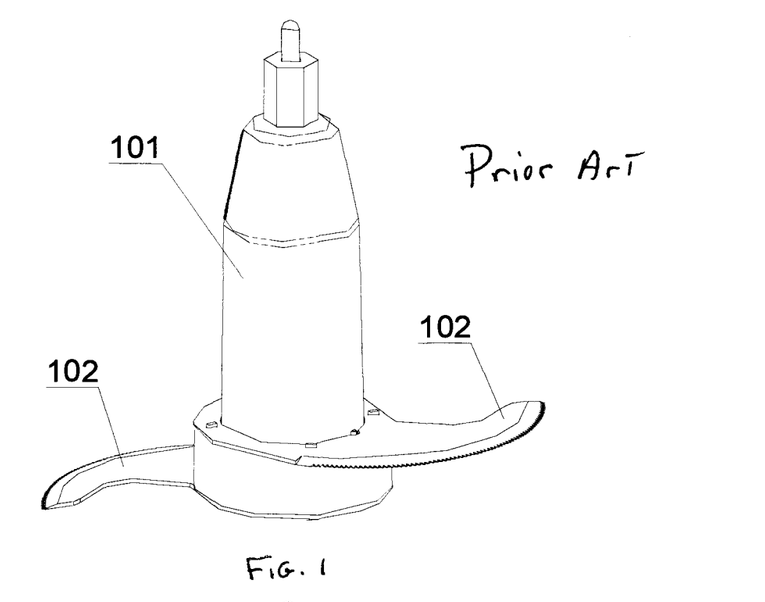
FIG. 1 is a perspective view of one embodiment of a prior art cutting implement for a food processor.
Figure 2:
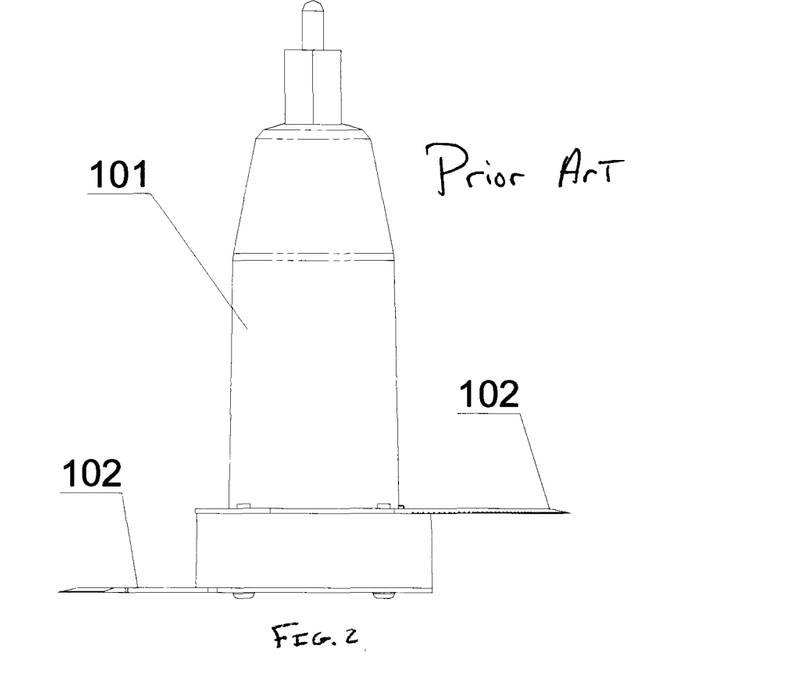
FIG. 2 is a side elevation thereof.

FIGS. 1 and 2 are schematic diagrams of a prior art cutting implement for a food processor with a rotor 101 that rotates by means of a driving device and two blades 102 secured to the rotor 101. The blades 102 are flat and disposed to rotate at different levels. Food is placed in the processor and the driving device electrically drives the rotation of the rotor 101 and the blades 102. The blades 102 cut and grind the food as they rotate. The blades 102 are flat and there is a gap between them. Only the food on the flat plane of the blades 102 gets cut, but the food in the gap between the two blades 102 does not get cut. The food that does not get cut must drop onto the flat plane of the blades 102 by means of its own weight and the interaction with the other food in order for it to get cut. The result is that the food in the processor is not cut evenly, and more time is necessary to ensure that it is ground properly, making for less efficiency, increasing energy consumption and reducing the service life of the processor.

Figure 3:
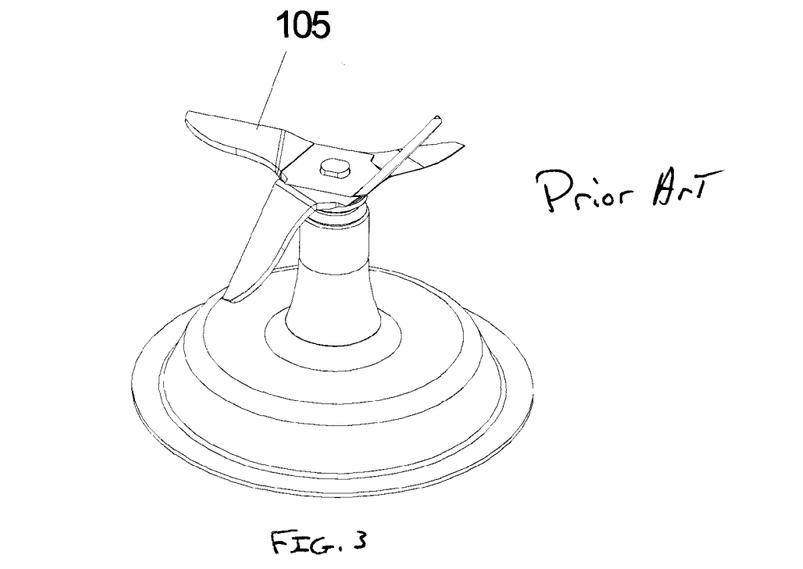
FIG. 3 is a perspective view of another embodiment of a prior art cutting implement for a food processor.
Figure 4:
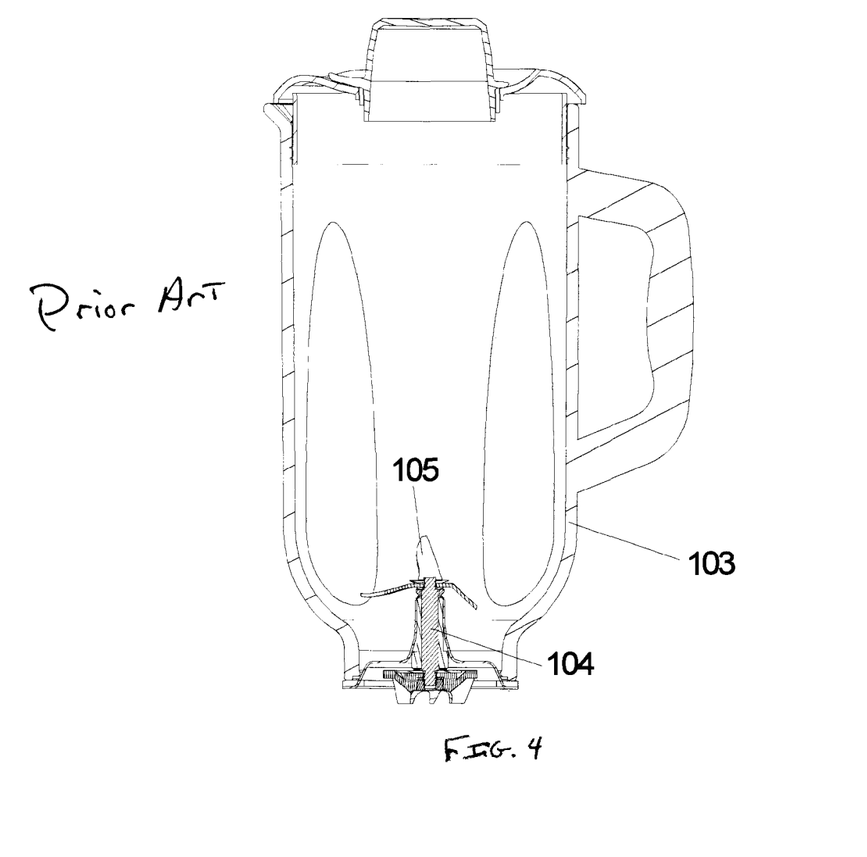
FIG. 4 is side elevation of the cutting implement of FIG. 3 assembled with a pitcher of the food processor.

FIGS. 3 and 4 are schematic diagrams of another type of prior art cutting implement for a food processor with a pitcher 103 in which the food is placed, a blade axle 104 driven by the driving device and a blade assembly 105 secured to the blade axle 104. The blade assembly 105 consists of an upright V-shaped cutting blade and an upside-down V-shaped cutting blade. The tilted sides of the two cutting blades have sharp edges oriented in the direction of rotation. The two cutting blades are arranged so that their upright and upside-down V-shapes alternate, and their sharp edges are longer, thus improving upon the drawbacks of flat cutting blades to a certain degree. Fairly large gaps between them remain, however, meaning that the food in the gaps cannot be processed. The two cutting blades individually process the portion of food on their respective surfaces but are unable to connect and blend the food effectively, resulting in the uneven blending of the food.

SUMMARY

The present invention solves the technical problems of producing evenly processed food and achieving a higher working efficiency by providing a cutting implement for a food processor with single-piece arcuate blades.

In one embodiment, the cutting implement for a food processor generally comprises a blade axle rotatable on a rotation axis thereof in a direction of rotation of the blade axle. At least one blade assembly is mounted on the blade axle. The at least one blade assembly has at least one single-piece arcuate blade having an upper blade section coupled to the blade axle, a lower blade section separate from the upper blade section and coupled to the blade axle, and a middle blade section extending arcuately between and interconnecting the upper and lower blade sections. The single-piece arcuate blade has a leading edge in the direction of rotation of the blade axle, with the leading edge at least in part being configured to define a cutting edge of the single-piece arcuate blade.

In another embodiment, a cutting implement for a food processor generally comprises a blade axle rotatable on a rotation axis thereof in a direction of rotation of the blade axle. At least one blade assembly is mounted on the blade axle. The at least one blade assembly has at least one single-piece arcuate blade having an upper blade section coupled to the blade axle, a lower blade section separate from the upper blade section and coupled to the blade axle, and a middle blade section extending arcuately between and interconnecting the upper and lower blade sections. The single-piece arcuate blade has a leading edge in the direction of rotation of the blade axle, with the leading edge at least in part being configured to define a cutting edge of the single-piece arcuate blade. The at least one single-piece arcuate blade is configured such that the leading edge of the blade is other than parallel to the rotation axis of the blade axle.

BRIEF DESCRIPTION

Corresponding reference characters indicate corresponding parts throughout the several views of the drawings.

DETAILED DESCRIPTION

Figure 5:
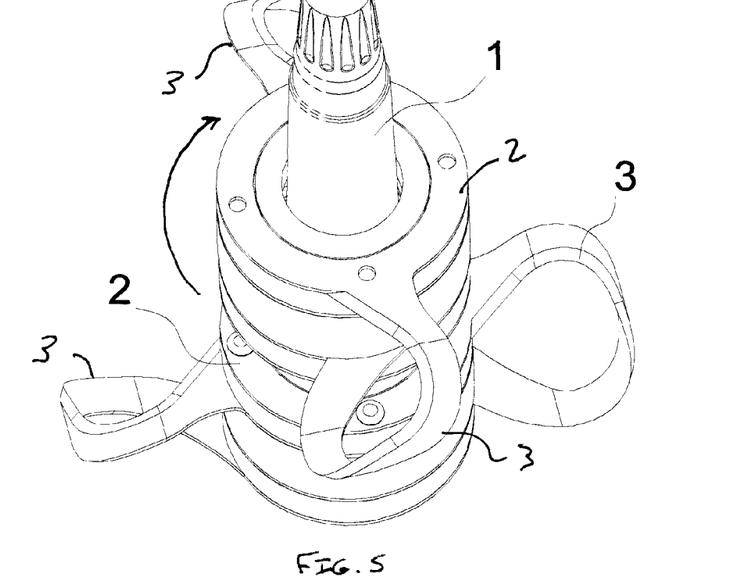
FIG. 5 is a perspective view of one embodiment of a cutting implement for a food processor according to the present disclosure.
Figure 15:
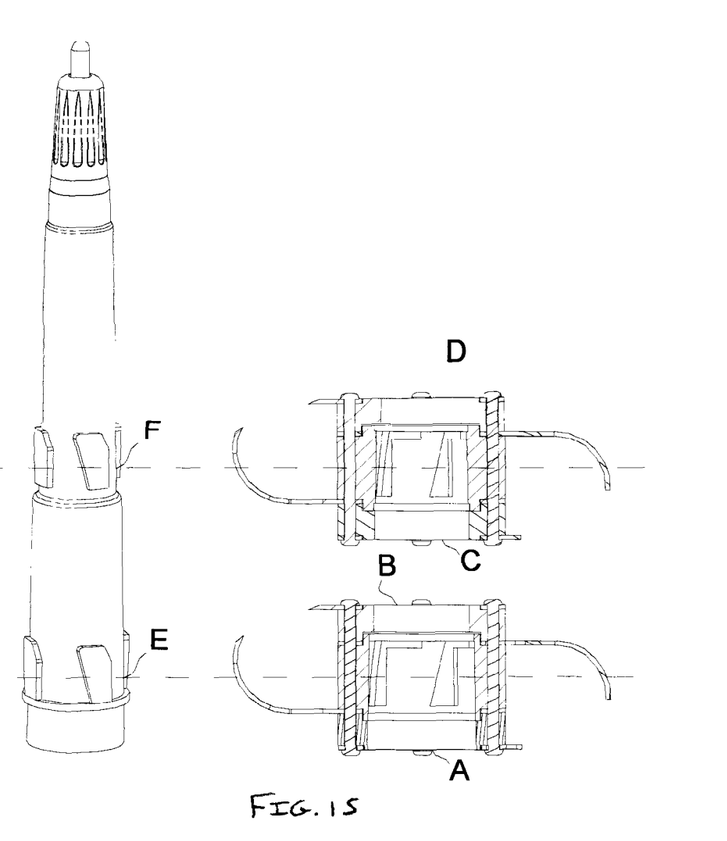
FIG. 15 is schematic diagram of the cutting implement of FIG. 5 with a pair of blade assemblies unassembled from the blade axle.

Referring now to the drawings, and in particular to FIGS. 5-10, one embodiment of a cutting implement for a food processor comprises a blade axle 1 rotatable on a rotation axis thereof (such as a by a suitable drive motor of the food processor) in a direction of rotation (indicated by the direction arrow in FIGS. 5 and 7), and a pair of blade assemblies 2 mounted on the blade axle 1 in a stacked arrangement as illustrated further in FIG. 15 and described later herein. It is understood that the cutting implement thus has at least one blade assembly 2, and may have a single blade assembly, a pair of blade assemblies as illustrated in FIGS. 5 and 15, or more than two blade assemblies.

Each blade assembly 2 has a pair of single-piece arcuate blades 3 mounted on the blade axle 1 for rotation with the blade axle in the direction of rotation about the rotation axis of the blade axle. Each single-piece arcuate blade has (with particular reference to FIG. 7) an upper blade section 29 coupled to the blade axle 1, a lower blade section 33 separate from and spaced longitudinally (e.g., height wise in the illustrated embodiments) from the upper blade section, and a middle blade section 31 extending arcuately between and interconnecting the upper and lower blade sections. In the illustrated embodiment each blade assembly 2 has two single-piece arcuate blades 3 in a generally stacked arrangement on the blade axle. Thus, each blade assembly 2 has at least one single-piece arcuate blade 3, such that in may have a single arcuate blade 3, two arcuate blades 3 as illustrated in FIG. 6, or more than two arcuate blades.

Each single-piece arcuate blade 3 has a leading edge (relative to the direction of rotation of the blade axle 1) sharpened along at least a portion thereof to define a cutting edge 32 of the blade. In the illustrated embodiment the cutting edge extends continuously along the entire length of the upper blade section 29, middle blade section 31 and lower blade section 33. Each single-piece arcuate blade 3 further includes an upper mounting ring 35 integral with the upper blade section 29 of the blade for coupling the upper blade section to the blade axle 1, and a corresponding lower mounting ring 37 integral with the lower blade section 33 of the blade for coupling the lower blade section to the blade axle 1.

Figure 7:
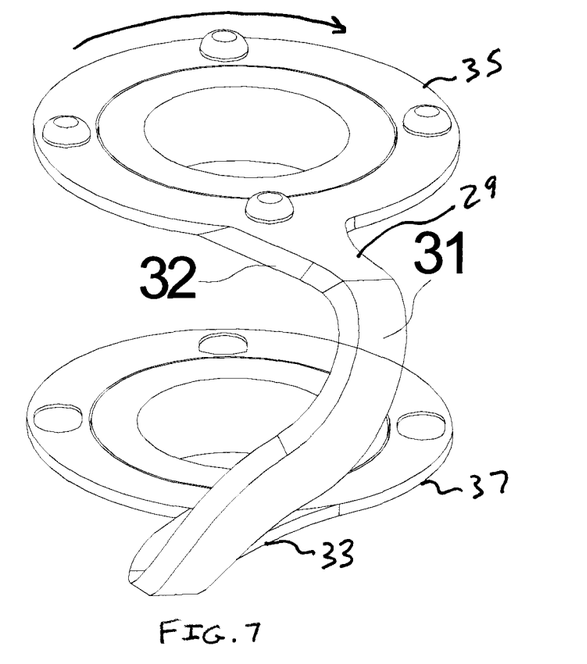
FIG. 7 is a perspective view of a single-piece arcuate blade of the blade assembly of FIG. 6.
Figure 8:
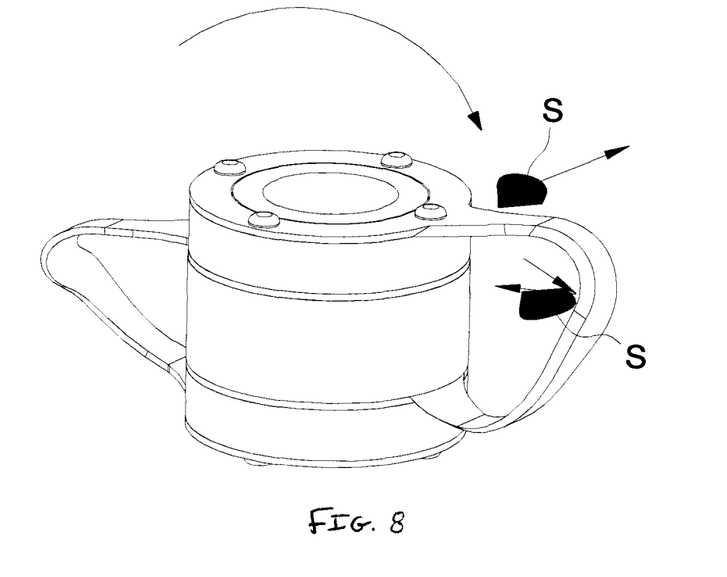
FIGS. 8, 9 and 10 are operating diagrams illustrating different aspects of operation of the cutting implement of FIG. 5.
Figure 9:
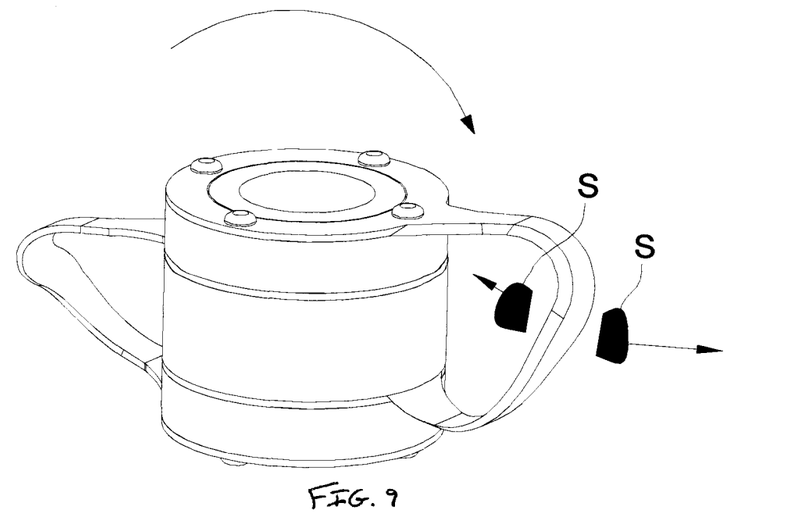
Figure 10:
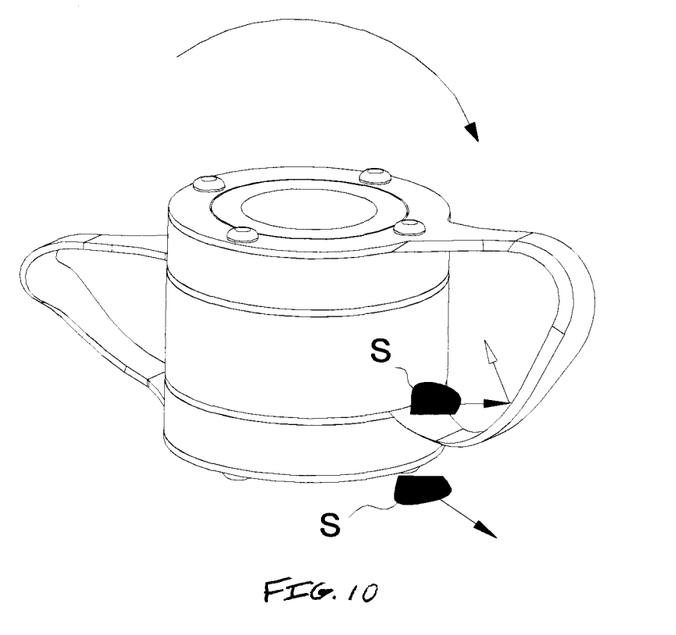

As shown in FIG. 7, the arcuate shape of the single-piece arcuate blade 3 transitions from the upper blade section 29 to the middle blade section 31 in a generally reverse direction (relative to the direction of rotation of the blade axle 1) and transitions from the middle blade section 31 to the lower blade section 33 in a generally forward direction (relative to the direction of rotation of the blade axle 1). The cutting edge 32 of the blade 3 is thus other than planar and other than parallel to the rotation axis of the blade axle. Accordingly, in operation the blade 3 produces an oblique cutting action on food disposed in the food processor, e.g., from shallow to deep, and allows for a small force to complete the cutting action. The food processor is thus able to use a slower rotational speed to achieve the same cutting results as cutting implements of prior food processors, and is conducive to reducing the food processor's strength requirements and reducing energy use.

Figure 6:
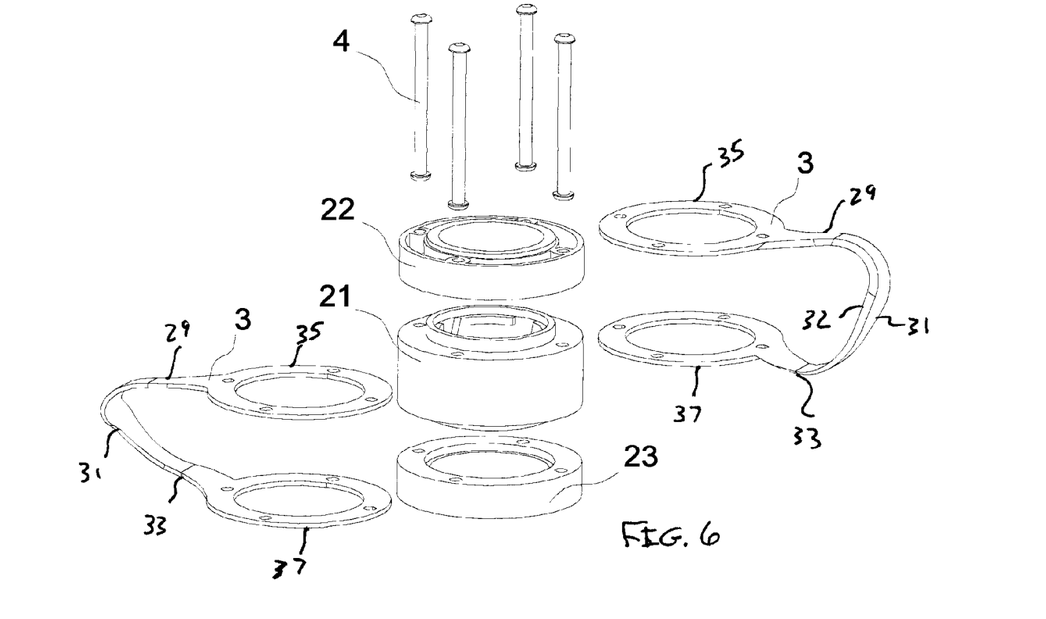
FIG. 6 is an exploded view of one blade assembly of the cutting implement of FIG. 5.

As shown in FIG. 6, each blade assembly 2 includes a hub 21 mounted on the blade axle 1, an upper support ring 22 disposed above an upper end of the hub 21 and a lower support ring 23 disposed below the lower end of the hub. In the illustrated embodiment, the upper mounting ring 35 of one (e.g., an upper) single-piece arcuate blade 3 is secured to the upper end of the upper support ring 22 and the lower mounting ring 37 of the upper blade 3 is secured between the hub 21 and the lower support ring 23. The upper mounting ring 35 of the other (e.g., lower) single-piece arcuate blade 3 is secured between the upper support ring 22 and the hub 21, and the lower mounting ring 37 of the lower blade 3 is secured to the lower end of the lower support ring 23.

Figure 11:
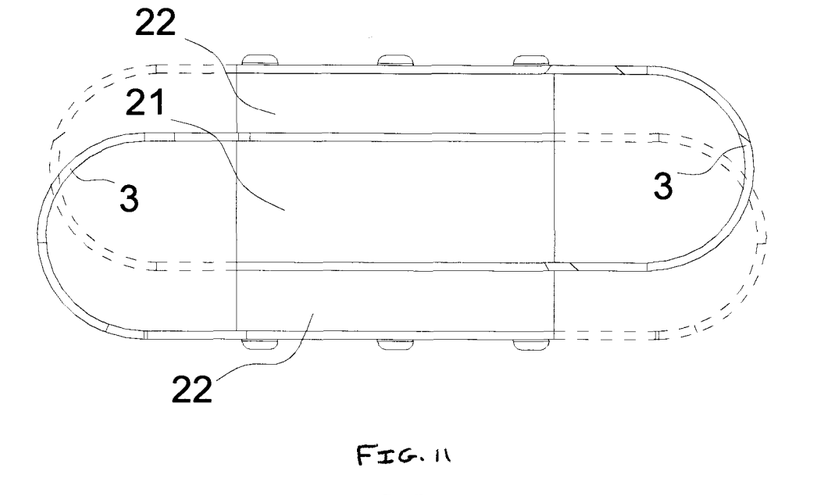
FIG. 11 is a schematic illustration of the trajectory of movement of the arcuate blade of the blade assembly of FIG. 6.

The two arcuate blades 3 are disposed on symmetrically opposite sides of the blade assembly 2 to provide balance to the rotation without any shaking, along with making the cutting process more even. The longitudinal offset of the upper and lower blades 3 of each blade assembly 2 allows the respective paths of movement of the blades to cross in an X pattern as illustrated in FIG. 11. This creates a multi-layer cutting effect which accelerates the cutting action and makes it more effective. The food shards bounced back by the middle blade section 31 of each arcuate blade 3 are further acted upon by the other blades 3, further speeding up the working efficiency.

As shown in FIG. 6, the upper support ring 22, the frame 21, the lower support ring 23 and the upper and lower mounting rings 35, 37 of the arcuate blades 3 of each blade assembly are secured together by rivets 4. Rivets are effective fasteners with a simple structure making them easy to use. Accordingly, each blade assembly 2 is held in assembly for disposition on and removal from the blade axle 1 as a unit. It is understood that fastening other than by rivets may be used.

Figure 12:
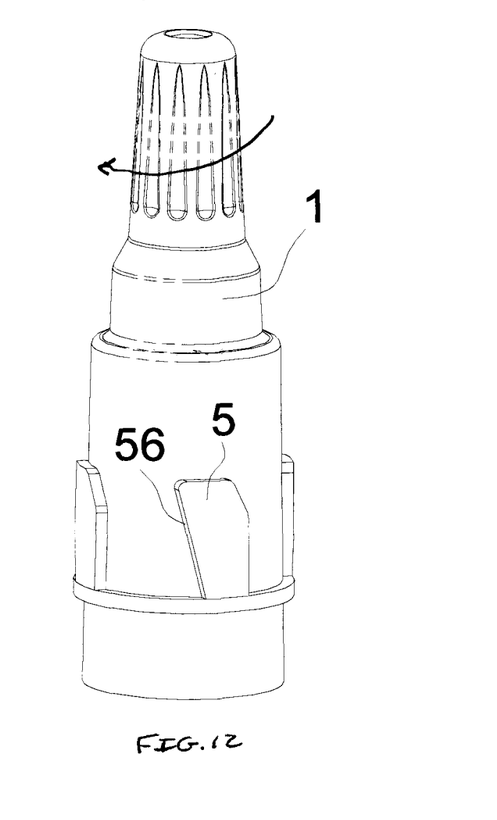
FIG. 12 is a perspective view of a blade axle of the cutting implement of FIG. 5.
Figure 13:
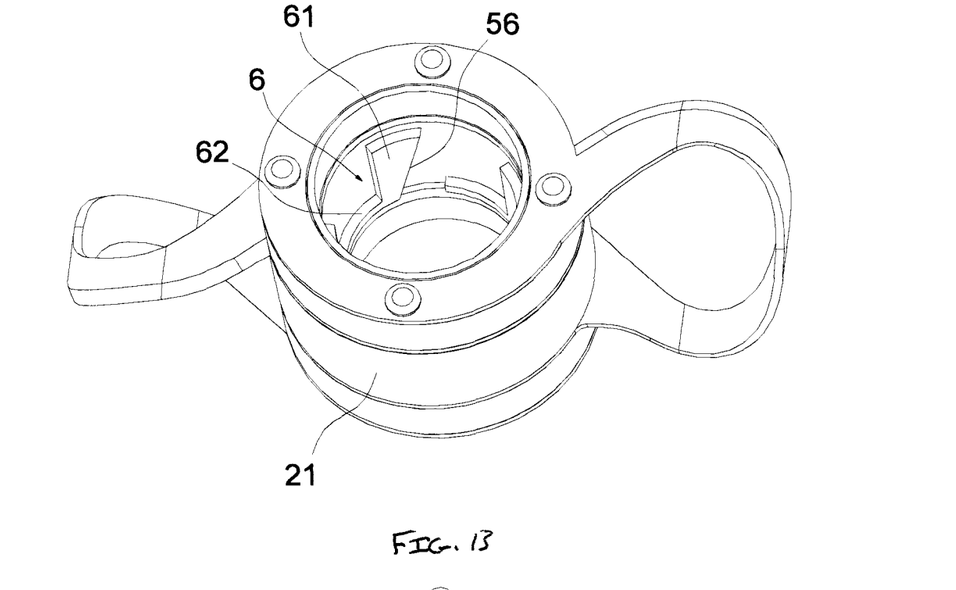
FIG. 13 is a perspective view of the blade assembly of FIG. 6 including a pair of the single-piece arcuate blades of FIG. 7.
Figure 14:
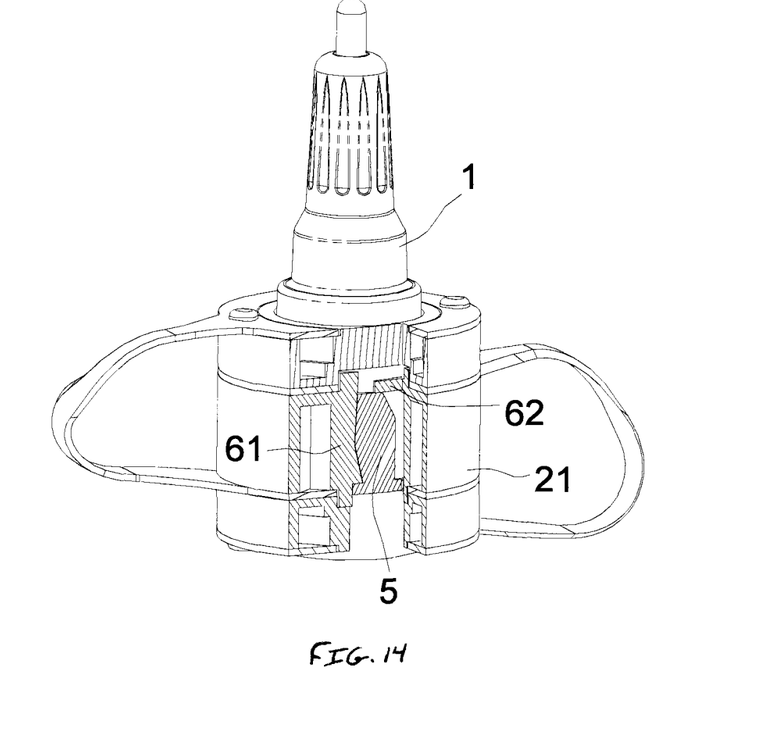
FIG. 14 is a perspective view of the cutting implement of FIG. 5 with one blade assembly thereon and with portions removed to reveal internal construction.

As shown in FIGS. 12 to 14, multiple positioning bosses 5 are evenly distributed along the circumference of the outer surface of the blade axle 1. Multiple positioning ribs 6 in the shape of the number seven matching and securing to the positioning bosses 5 are distributed on the inside of the hub 21. The vertical sides 61 of the positioning ribs 6 match the rotational direction of one of the positioning bosses 5, and the matching plane is a diagonal plane 56 tilted in a reverse direction. The top sides 62 of the positioning ribs 6 tightly abut the top section of the previous positioning boss 5 in the direction of rotation of the blade axle 1. The diagonal plane 56 is the force-receiving plane in the direction of rotation of the blade axle 1 and the hub 21. The diagonal plane 56 is tilted in a reverse direction (relative to the direction of rotation) from top to bottom. The blade axle 1 thus exerts a diagonal downward force on the hub 21 making it press tightly against the blade axle 1 without springing upward. The top sides 62 of the positioning ribs 6 tightly abut the top section of the positioning boss 5 in order to set the vertically configured position and define the upper position of the blade assembly 2 on the blade axle 1.

As shown in FIGS. 5 and 15, in the illustrated embodiment two blade assemblies 2 are mounted on the blade axle 1 in a stacked arrangement, including an upper blade assembly and a lower blade. The diameter of the blade axle 1 and the blade assemblies 2 gradually increases moving from top to bottom. The aperture of section A at the lower end of the lower blade assembly is $\Phi A$, and the aperture of section B at the upper end is $\Phi B$. The diameter of section E between the blade axle 1 and the lower blade assembly is $\Phi E$. The aperture of section C at the lower end of the upper blade assembly is $\Phi C$, and the aperture of section D at the upper end is $\Phi D$. The diameter of section F between the blade axle 1 and the upper blade assembly is $\Phi F$. Thus $\Phi A > \Phi E > \Phi B$, and $\Phi C > \Phi F > \Phi D$, which is why the lower blade assembly does not move in reverse, ensuring that the implement works properly. At the same time $\Phi B > \Phi F$, so that the lower blade assembly cannot be mounted in the section for the upper blade assembly, while $\Phi F > \Phi D$, preventing the upper blade assembly from sliding down to the section for the lower blade assembly and ensuring that the blade assemblies are mounted properly so that the cutting performance for the food processor is not compromised.

Figure 16:
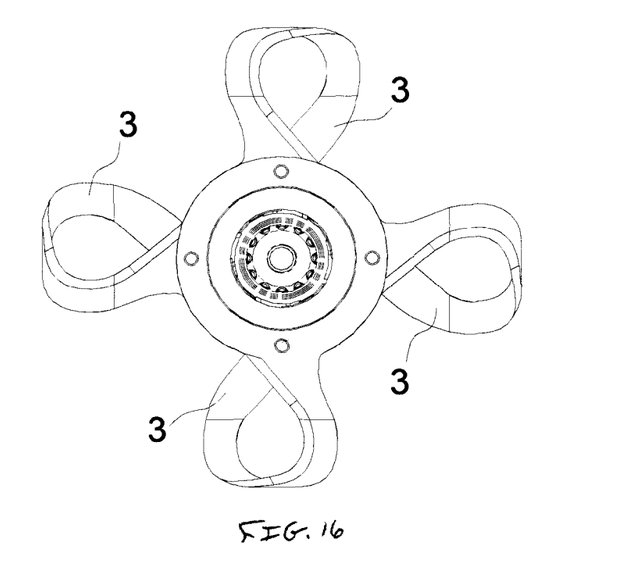
FIG. 16 is top plan view of the cutting implement of FIG. 5.

As shown in FIG. 16, the single-piece arcuate blades 3 of the upper blade assembly and the lower blade assembly project 90 degrees in the direction of the center of the blade axle 1. The two symmetrically disposed arc-shaped curved blades provide balance to the rotation without any shaking, along with making the cutting process more even. Additionally, in this arrangement, the arcuate blades 3 are disposed about the rotation axis of the blade axle 1 in an alternating high and low formation. Thus, in operation, the blade axle 1 rotates along its axis and drives rotation of the blade assemblies 2 and the arcuate blades 3. Food S in the food processor drops onto the rotating trajectory of the arcuate blades 3 by means of its weight and centrifugal force. The multiple cutting edges 32 of the arcuate blades 3 process the food S, and the shards of food being cut are impacted by the middle blade sections 31 by centrifugal force and then bounced back into the paths of the blades by the inner surfaces of the middle blade sections.

In the cutting implement for a food processor described above, one, three or more blade assemblies 2 may be mounted onto the blade axle 1. The single-piece arcuate blades 3 on the same blade assembly 2 or between different blade assemblies can be mounted so that they project at 90 degrees. They may also be arranged in a balanced fashion or at different angles.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A cutting implement for a food processor, the cutting implement comprising a blade axle rotatable on a rotation axis thereof in a direction of rotation of the blade axle, and at least one blade assembly mounted on the blade axle, the at least one blade assembly comprising at least one single-piece arcuate blade having an upper blade section coupled to the blade axle, a lower blade section separate from the upper blade section and coupled to the blade axle, and a middle blade section extending arcuately between and interconnecting the upper and lower blade sections, the single-piece arcuate blade having a leading edge in the direction of rotation of the blade axle, said leading edge at least in part being configured to define a cutting edge of the single-piece arcuate blade.

2. The cutting implement set forth in claim 1 wherein the at least one single-piece arcuate blade transitions from the upper blade section to the middle blade section in one of a reverse direction and a forward direction relative to the direction of rotation of the blade axle.

3. The cutting implement set forth in claim 2 wherein the at least one single-piece arcuate blade transitions from the middle blade section to the lower blade section in a direction opposite the direction of transition of the upper blade section to the middle blade section.

4. The cutting implement set forth in claim 1 wherein the at least one single-piece arcuate blade transitions from the middle blade section to the lower blade section in one of a reverse direction and a forward direction relative to the direction of rotation of the blade axle.

5. The cutting implement set forth in claim 1 wherein the cutting edge extends along at least part of the upper blade section, along the entire middle blade section and along at least part of the lower blade section of the single-piece arcuate blade.

6. The cutting implement set forth in claim 1 wherein the at least one blade assembly further comprises a hub mounted on the blade axle for rotation therewith, an upper support ring disposed on the blade axle above the hub and a lower support ring disposed on the blade axle below the hub, the blade assembly having a pair of single-piece arcuate blades in a stacked arrangement to define an upper arcuate blade and a lower arcuate blade, each arcuate blade further comprising an upper mounting ring extending from the upper blade section thereof and a lower mounting ring extending from the lower blade section thereof, the upper mounting ring of the upper arcuate blade being secured to the upper support ring and the lower mounting ring of the upper arcuate blade being secured between the hub and the lower support ring, the upper mounting ring of the lower arcuate blade being secured between the hub and the upper support ring and the lower mounting ring of the lower arcuate blade being secured to the lower support ring.

7. The cutting implement set forth in claim 6 wherein the blade assembly is held in assembly for disposition on and removal from the blade axle as a unit.

8. The cutting implement set forth in claim 1 wherein the at least one blade assembly comprises a pair of single-piece arcuate blades in circumferentially spaced relationship with each other about the rotation axis of the blade axle, said blades being circumferentially spaced approximately 180 degrees from each other.

9. A cutting implement for a food processor, the cutting implement comprising a blade axle rotatable on a rotation axis thereof in a direction of rotation of the blade axle, and at least one blade assembly mounted on the blade axle, the at least one blade assembly comprising at least one single-piece arcuate blade having an upper blade section coupled to the blade axle, a lower blade section separate from the upper blade section and coupled to the blade axle, and a middle blade section extending arcuately between and interconnecting the upper and lower blade sections, the single-piece arcuate blade having a leading edge in the direction of rotation of the blade axle, said leading edge at least in part being configured to define a cutting edge of the single-piece arcuate blade, said at least one single-piece arcuate blade being configured such that the leading edge of the blade is other than parallel to the rotation axis of the blade axle.

10. The cutting implement set forth in claim 9 wherein the at least one single-piece arcuate blade is configured such that the leading edge of the blade is serpentine.

11. The cutting implement set forth in claim 9 wherein the at least one single-piece arcuate blade transitions from the upper blade section to the middle blade section in one of a reverse direction and a forward direction relative to the direction of rotation of the blade axle.

12. The cutting implement set forth in claim 11 wherein the at least one single-piece arcuate blade transitions from the middle blade section to the lower blade section in a direction opposite the direction of transition of the upper blade section to the middle blade section.

13. The cutting implement set forth in claim 9 wherein the at least one single-piece arcuate blade transitions from the middle blade section to the lower blade section in one of a reverse direction and a forward direction relative to the direction of rotation of the blade axle.

14. The cutting implement set forth in claim 9 wherein the cutting edge extends along at least part of the upper blade section, along the entire middle blade section and along at least part of the lower blade section of the single-piece arcuate blade.

15. The cutting implement set forth in claim 9 wherein the at least one blade assembly further comprises a hub mounted on the blade axle for rotation therewith, an upper support ring disposed on the blade axle above the hub and a lower support ring disposed on the blade axle below the hub, the blade assembly having a pair of single-piece arcuate blades in a stacked arrangement to define an upper arcuate blade and a lower arcuate blade, each arcuate blade further comprising an upper mounting ring extending from the upper blade section thereof and a lower mounting ring extending from the lower blade section thereof, the upper mounting ring of the upper arcuate blade being secured to the upper support ring and the lower mounting ring of the upper arcuate blade being secured between the hub and the lower support ring, the upper mounting ring of the lower arcuate blade being secured between the hub and the upper support ring and the lower mounting ring of the lower arcuate blade being secured to the lower support ring.

16. The cutting implement set forth in claim 15 wherein the blade assembly is held in assembly for disposition on and removal from the blade axle as a unit.

\* \* \* \* \*